United States Patent [19]

Markfort et al.

[11] Patent Number: 5,451,304
[45] Date of Patent: Sep. 19, 1995

[54] PROCESS FOR THE ELECTROPHORETIC INTERNAL COATING OF METAL CONTAINERS FOR THE STORAGE OF FOODSTUFFS AND BEVERAGES

[75] Inventors: Klaus Markfort, Tecklenburg; Michael Stenger; Walter Jouck, both of Münster, all of Germany; Paul Harris, West Bloomfield, Mich.

[73] Assignee: BASF Lacke & Farben AG, Muenster-Hiltrup, Germany

[21] Appl. No.: 211,064

[22] PCT Filed: Sep. 12, 1992

[86] PCT No.: PCT/EP92/02099
§ 371 Date: Mar. 28, 1994
§ 102(e) Date: Mar. 28, 1994

[87] PCT Pub. No.: WO93/06263
PCT Pub. Date: Apr. 1, 1993

[30] Foreign Application Priority Data

Feb. 26, 1991 [DE] Germany ............... 41 323 083.2

[51] Int. Cl.$^6$ ............................................. C25D 13/14
[52] U.S. Cl. ........................... 204/180.1; 204/181.6; 523/415; 525/65; 525/107; 525/438
[58] Field of Search ............... 204/180.7, 181.6, 181.7; 523/415, 65; 525/65, 107, 438

[56] References Cited

U.S. PATENT DOCUMENTS 4,623,860 11/1986 Azarnia et al. ............... 523/412
5,322,863 6/1994 Figge et al. ................... 523/415

FOREIGN PATENT DOCUMENTS 009110712 7/1991 WIPO.

*Primary Examiner*—John Niebling
*Assistant Examiner*—Kishor Mayekar
*Attorney, Agent, or Firm*—Anne Gerry Sabourin

[57] ABSTRACT

The present invention relates to a process for the electrophoretic internal coating of metal containers for the storage of foodstuffs and beverages, the aqueous coating composition used containing 0.01 to 10% by weight, preferably 0.5 to 3% by weight, relative to the solids content of the coating composition, of wax changing into the molten state in the range from 60° C. to 100° C. The process is used in particular for the internal coating of 3-part and 2-part cans and drawn-and-ironed or otherwise deep-drawn cans.

15 Claims, No Drawings

PROCESS FOR THE ELECTROPHORETIC INTERNAL COATING OF METAL CONTAINERS FOR THE STORAGE OF FOODSTUFFS AND BEVERAGES

The present invention relates to a process for the electrophoretic internal coating of metal containers for the storage of foodstuffs and beverages, using an aqueous coating composition.

The application of internal protective can coatings by means of electrophoretic deposition is known. The internal can coatings here have to meet special requirements, since they must have a very high resistance to hydrolysis and chemicals. The coatings must be resistant, for example, during storage in contact with predominantly acidic filling materials. Anodic electrodip coating is here in principle more advantageous than the cathodic variant, since the cathodically deposited films in most cases contain amino groups and thus can be less resistant on contact with acidic filling materials. Internal protective can coatings must also meet stringent regulations under food law, and the coatings must not show any hydrolysis reactions under the conditions of pasteurization and during prolonged storage.

The electrophoretic application of internal protective can coatings is advantageous since, as compared with spray application, a substantially higher coating yield and a further reduced emission of solvents can be achieved. Moreover, by means of electrophoretic deposition, the coating of very diverse can geometries is possible as a result of the effect of throwing power during electrophoretic deposition. As compared with spray application, a uniform layer thickness and good edge coverage can be achieved. Furthermore, the electrodip coating process provides the best conditions for process automation.

A large number of electrophoretically depositable coating agents for the internal coating of metal containers, which are suitable for the storage of foodstuffs and beverages (so-called "food-contacting coatings"), are known.

In many cases, these concern hydroxyester-based binders which are obtained by reacting copolymers containing carboxyl groups with epoxide resins. Such electrophoretically depositable, internal protective can coatings are known, for example, from EP-A-6334 and EP-A-6336. Other known internal protective can coatings suitable for electrophoretic application are based on polymer mixtures which are obtained by free-radical copolymerization of ethylenically unsaturated monomers, some of which contain carboxyl groups, in the presence of an epoxide resin and of peroxide initiators (see U.S. Pat. No. 4,212,781, U.S. Pat. No. 4,308,185, WO 88/1287).

Further electrophoretically depositable internal protective can coatings are described, for example, in DE-A-2,805,657, DE-A-3,601,560, U.S. Pat. No. 4,476,263 and EP-A-216,337.

Finally, U.S. Pat. No. 4,136,075 has disclosed aqueous internal can coatings which are based on acrylate resins and can contain waxes, for example carnauba wax, as additives. The coatings are not appl ied electrophoretically, but by means of spray application, dip-coating, roller-coating or brushing.

In electrophoretic deposition, the deposited wet film is subjected to a rinsing step which has a decisive influence on the quality of the dried film. The rinsing medium used is extracted ultrafiltrate, deionized water or a deionized water/solvent/amine mixture. With the coating agents, known from the state of the art, for internal can coating, the problem frequently arises that the deposited films have an inadequate stability during the rinsing step following the electrophoretic deposition, since the wet film can partially be incipiently dissolved by the rinsing medium. The thus resulting thinner coating films or, in an extreme case, complete exposure of the substrate in some areas cause high porosity values and hence unsatisfactory stability of the filling material. This sensitivity to rinsing, which occurs, of the electrophoretically deposited wet film depends on a number of factors, in particular, of course, on the nature of the coating agent, on the surface tension of the rinsing medium, ie. on the solvent content, on the neutralizing agent and coating residues, and also on application parameters, ie., for example, on the voltage applied and on the coating time during the deposition and on turbulence during the dipping into the rinsing basin.

The object on which the present invention is based was to provide a process for the electrophoretic internal coating of metal containers, for example cans, wherein no sensitivity of the applied wet film to rinsing occurs, ie. wherein the wet film is not incipiently dissolved, and wherein, consequently, excellent porosity behavior and excellent resistance to filling material are obtained.

The process should be easy to carry out and universally applicable, ie. it should be possible to use the most diverse coating agents in the process. Moreover, no further restrictions with respect to process parameters in electrophoretic deposition should have to be accepted.

The object on which the invention is based is achieved by the process mentioned at the outset, which is characterized in that the aqueous depositable coating composition contains 0.01 to 10% by weight, preferably 0.5 to 3% by weight, relative to the solids content of the coating composition, of wax changing into the molten state in the range from 60° C. to 100° C.

The waxes used are preferably natural waxes, namely vegetable waxes such as carnauba wax, montan wax, candelilla wax, Japan wax, guaruma wax, cork wax, rice germ oil wax and sugar cane wax, animal waxes such as, for example, beeswax and shellac wax, and also mineral waxes such as, for example, paraffin waxes and microwaxes, which are obtained as so-called petroleum waxes from crude oil.

According to the application, however, synthetic waxes or chemically modified wax types can also be used, provided that they change into the molten state in the temperature range from 60° C. to 100° C. Examples of synthetic waxes or chemically modified waxes are the paraffins obtained according to the Fischer-Tropsch process by air oxidation, selective solvent treatment, esterification, saponification and the like, and also polyethylene waxes and the hydrogenated castor oil known under the name castor wax.

In every case, it is important that the waxes are used in a proportion of 0.01 to 10% by weight, preferably 0.5 to 3% by weight, relative to the solids content of the finished, depositable coating agent, that is to say relative to the solids content of the finished electrodip coating bath composition. If more than 10% by weight of wax, relative to the solids content of the coating composition, is used, the wax can no longer be sufficiently finely dispersed.

The wax can be added directly to the organic resin stage, ie. to the organic solution of the binder and, if appropriate, crosslinking agent, this being followed by neutralization with ammonia and/or amine and dispersing in water. It is also possible, however, to add a wax dispersion to the finished electrodip coating dispersed in water, but care must be taken to ensure that the wax dispersion is predispersed with the aqueous electrophoretic coating, since otherwise the wax dispersion cannot be sufficiently finely dispersed and might float up again. With particular preference, a wax emulsion is used which can then be added directly to the finished electrodip coating. If wax emulsions are used, it is not necessary to pre-disperse the wax emulsion with the electrodip coating. Examples of suitable wax emulsions are the montan wax emulsion Luba Print KL 30 made by L. P. Bader & Co. GmbH and the carnauba wax emulsion Aquacer 510 made by Byk Cera.

Preferably, natural waxes are used, and with particular preference carnauba wax and/or montanic acid ester waxes. For example, the carnauba wax used is the 30% aqueous dispersion obtainable under the trade name Ceracol 181 from Byk Cera. Examples of further commercially available suitable waxes are: Luba-print wax dispersions made by L. P. Bader & Co. GmbH, for example those of the name LP KL 30 and LP 899/B, Aquacer 510 made by Byk Cera, Aquamat 206 made by Byk Cera, Polyslip EN 21 and Polyslip WG 40 made by Polychimie, France.

According to the present application, the most diverse electrophoretically depositable aqueous coating compositions can be used. Below, coating compositions are described which are particularly suitable for the process according to the invention, ie. when these coating compositions are used, the process according to the invention leads to particularly good results with respect to rinsing sensitivity, porosity and ultimately resistance to the filling material. Preferably, the coating compositions are used which are described in WO 88/1287, DE-A-4,001,251 and also those described in U.S. Pat. No. 4,212,781 and U.S. Pat. No. 4,308,185. The can coatings described in WO 88/1287 contain a binder solution which contains a) 30 to 70% by weight of a binder a having an acid number from 20 to 150 mg of KOH/g, b) 2 to 30% by weight, preferably 5 to 16% by weight, of at least one phenoplast resin and/or aminoplast resin b, c) 1 to 7% by weight, preferably 2 to 5% by weight, of ammonia and/or an amine as neutralizing agent and d) 20 to 60% by weight of organic solvents, the total of the proportions by weight of the components a to d always being 100% by weight, and the binder a having been prepared by I. A) 20 to 80% by weight of an epoxide resin having on average more than one epoxide group per molecule and a number-average molecular weight of at least 500 having been reacted, at temperatures from 80° to 200° C., preferably 120° C. to 180° C., with the use of catalysts, with B) 1 to 60% by weight of a polyester resin containing carboxyl groups and having a number-average molecular weight from 500 to 5,000 and an acid number from 30 to 150 mg of KOH/g, in such a way that at least 80% of the oxirane rings initially present have been opened, and II. C) 10 to 50% by weight of ethylenically unsaturated monomers, 10 to 50% by weight of the monomers containing carboxyl groups, having been polymerized, in the presence of the reaction product obtained in the first process step, at temperatures from 100° C. to 160° C., preferably 120° C. to 140° C. using at least 2% by weight, relative to the weight of the ethylenically unsaturated monomers C, of peroxide initiators, the total of A), B) and C) being 100% by weight.

The coating compositions, which are known from DE-A-4,001,251 and are preferably used according to the application, are based on a binder solution which contains a) 30 to 70% by weight of a binder a having an acid number from 20 to 150 mg of KOH/g, b) 2 to 30% by weight, preferably 5 to 16% by weight, of at least one phenoplast resin and/or aminoplast resin and/or an isocyanate crosslinking agent as crosslinking agent b, c) if appropriate 1 to 7% by weight, if appropriate preferably 1 to 5% by weight, of ammonia and/or an amine as neutralizing agent and d) 5 to 60% by weight of organic solvents, the total of the proportions by weight of the components a to d always being 100% by weight, and the binder a having been prepared by I. A) 20 to 80% by weight of an epoxide resin having on average more than one epoxide group per molecule and a number-average molecular weight of at least 850, having been reacted, at temperatures from 80° to 200° C. preferably 120° to 180° C., with the use of catalysts, with B) 1 to 60% by weight of a polyester resin containing carboxyl groups and having a number-average molecular weight from 500 to 5,000 and an acid number from 2 to <30 mg of KOH/g, in such a way that at least 50%, preferably 50 to <80%, of the oxirane rings initially present have been opened, and II. C) 10 to 50% by weight of ethylenically unsaturated monomers, 10 to 50% by weight of the monomers containing carboxyl groups, having been polymerized, in the presence of the reaction product obtained in the first process step, at temperatures from 60° to 200° C., preferably 120° to 140° C., using at least 2% by weight, relative to the weight of the ethylenically unsaturated monomers C, of peroxide initiators, the total of the proportions by weight of the components A to C always being 100% by weight.

The aqueous coating compositions, some of which are known from U.S. Pat. No. 4,212,781 and which are preferably used, are based on a binder solution which contains a) 30 to 70% by weight of a binder a having an acid number from 45 to 150 mg of KOH/g, b) 2 to 30% by weight of at least one phenoplast resin and/or aminoplast resin as crosslinking agent b, c) 1 to 7% by weight of ammonia and/or an amine as neutralizing agent and d) 5 to 60% by weight of organic solvents, the total of the proportions by weight of the components a to d always being 100% by weight, and the binder a having been prepared by ethylenically unsaturated monomers, a part of the monomers containing carboxyl groups, having been polymerized, in the presence of an epoxide resin having on average more than one epoxide group per molecule and a number-average molecular weight from about 350 to about 20,000, at temperatures from 60° C. to 200° C., using at least 2% by weight, relative to the weight of the ethylenically unsaturated monomers, of peroxide initiators.

The coating agents described in U.S. Pat. No. 4,308,185 are also preferably used. They differ from the coatings known from U.S. Pat. No. 4,212,781 essentially by the fact that the epoxide resin used has been reacted, before, during or after the free-radical copolymerization, with compounds reactive with epoxide groups in such a way that the resulting binder is largely free of epoxide groups.

With respect to greater details of the coating agents preferably used, reference is made to the statements in WO 88/1287, DE-A-4,001,251, U.S. Pat. No. 4,212,781 and U.S. Pat. No. 4,308,185. Of course, however, other coating agents suitable for internal can coating can also be used according to the application.

In addition to the binder solutions and water, the coating agents used in the process according to the application can also contain pigments, fillers and further auxiliaries and additives, each in the conventional quantities.

Pigments and/or fillers are preferably used in quantities from 25 to 35% by weight, relative to the total weight of the coating composition. An example of pigments is titanium dioxide, for example the products obtainable under the trade names Titan Rutil RN 59, RCT 60, R 900 and RDI-S.

As fillers, barium sulfate, silica, potassium carbonate and also talc should be mentioned by way of example.

Preferably, the coating compositions also contain 0.01 to 5.0% by weight, relative to the total weight of the coating composition, of further auxiliaries and additives such as, for example, plasticizers, stabilizers, wetting agents, dispersing aids, catalysts and surface-active additives.

The solids content of the solution of the electrophoretically depositable coating agents is in the range from 5 to 30% by weight, preferably in the range from 8 to 20% by weight.

According to the claimed process, the aqueous coating agents are preferably applied by anodic electrodip coating.

The anodic electrodip coating is carried out in an open dipping solution which is continuously stirred and circulated by pumping, in order to prevent settling of the dispersed resin particles and pigments. The coating is effected by direct current in the range from 20 to 500 volt, the metal container to be coated being connected as the anode. The coating time is between 1 second and 3 minutes. After rinsing with water and, if appropriate, ultrafiltrate, the wet film is cured at temperatures from 150° C. to 250° C. for a baking time of from 1 second up to 30 minutes.

Preferably, beverage cans and foodstuffs cans are baked briefly at high temperatures (1 second to 250 seconds at temperatures from 200° to 230° C.). After baking the layer thickness of the internal can coating is in general in the range from 3 μm to 15 μm, preferably in the range from 4 μm to 8 μm.

Furthermore, however, it is also possible to apply the aqueous coating agents according to the claimed process by means of cathodic electrodip coating.

The metal containers to be coated can consist of the most diverse materials and have the most diverse geometries. The materials used can especially be aluminum, black plate, tin plate and various iron alloys, which, if appropriate, have been provided with a passivation layer based on nickel compounds, chromium compounds and zinc compounds. The packages can be coated in the form of half-can parts, ie. trunks and lids, as 3-part cans and as 2-part, drawn-and-ironed or otherwise deep-drawn beverage cans and foodstuffs cans.

By the process according to the invention, films are obtained which no longer contain any pores. This is to be ascribed to the fact that, due to the use of wax having a melting range from 60° C. to 100° C. in the quantitative proportions stated, the wet film has become insensitive to incipient dissolution during rinsing after the electrodip coating deposition. The porosity can be determined by filling the test can with an electrolyte and establishing by applying a fixed test voltage whether the insulating effect of the film is sufficient over a period of 4 seconds. In detail, the limit of the current intensity of at most 1.0 mA should be reached at a voltage of 6.3 volt in a 1% by weight NaCl solution. For the process according to the invention, these limits are achieved, whereas the values of the porosity are substantially higher without an addition of wax.

A further advantage which is obtained by the process according to the invention is that the addition of wax has a positive effect on the foaming behavior when the metal containers are filled with a filling material contining carbon dioxide, ie. the filling material then foams to a lesser extent.

The invention is explained below in more detail by reference to embodiment examples:

EXAMPLE 1

1200 g of the glycidyl ester of versatic acid, 900 g of 2-butanone, 900 g of trimellitic anhydride and 5 g of N,N-dimethylbenzylamine are heated to 90° C. in a four-necked flask fitted with a stirrer, thermometer and reflux condenser. When the viscosity (measured at 23° C.) has risen to 1.5 Pa.s, the batch is cooled and discharged.

A solution of 1050 g of an epoxide resin based on bisphenol A and having an epoxy equivalent weight of 3400 in 1000 g of butylglycol and 440 g of propylene glycol monophenyl ether is heated to 140° C. in a four-necked flask fitted with a stirrer, thermometer and distillation head. After the addition of 2 g of N,N-dimethylbenzylamine, 950 g of the polyesterpolycarboxylic acid prepared as described before are allowed to run in, and at the same time the solvent (2-butanone) is distilled off. The batch is held at 160° C. for a further 3 hours. The acid number is then 37 mg of KOH/g and the viscosity (of a 30% solution in butylglycol at 23° C.) is 380 mPa.s.

2100 g of the epoxy ester prepared and 300 g of butylglycol are first introduced into a four-necked flask fitted with a stirrer, thermometer, reflux condenser and two feed vessels. A mixture of 130 g of acrylic acid, 160 g of styrene and 200 g of butyl acrylate from the first feed vessel and a solution of 30 g of tert.-butyl perbenzoate in 40 g of butylglycol from the second feed vessel are simultaneously added thereto at 140° C. The monomers are metered in in the course of 2 hours, and the initiator in the course of 3 hours. Subsequently, the mixture is held at 140° C. for a further 4 hours. After the end of the polymerization, 190 g of a highly methylolated bisphenol A/formaldehyde resin are precondensed with the batch for 4 hours at 90° C. This gives a 56% binder solution.

The binder/crosslinking agent solution obtained is neutralized with 60% aqueous dimethylethanolamine solution, with vigorous stirring.

40 g of dimethylethanolamine and 7160 g of deionized water are added with vigorous stirring to 1800 g of the batch obtained. This gives a 12% dispersion.

36 g of 30% carnauba wax emulsion (trade name Aquacer 510 made by Cera Chemie bV) are added to 4500 g of the dispersion. This gives the dispersion A. The dispersion without added carnauba wax emulsion is called dispersion B below.

Beverage cans are electrodip-coated on the inside with the two dispersions A and B, washed with deionized water and ultrafiltrate and dried for 3 minutes at 240° C. in a circulating-air oven. The weight of the dry coating on the beverage cans coated on the inside in this way is 250 mg.

In the subsequent porosity test, the following measured results were obtained:

| Electrodip coating | Porosity with 1% sodium chloride solution |
| --- | --- |
| A | 0.9 mA |
| B | 5.0 mA |

EXAMPLE 2

18.14 parts of the epoxide resin Epikote 1007 ® (Shell) and 18.14 parts of the epoxide resin Epikote 1009 ® (Shell) are dissolved at 130° C. in 26.63 parts of butylglycol and 19.2 parts of hexylglycol. A monomer mixture of 6.62 parts of methacrylic acid, 4.18 parts of styrene and 4.55 parts of ethyl acrylate is added in the course of 2 hours and a mixture of 0.35 part of t-butyl perbenzoate and 2.17 parts of butylglycol is added in the course of 2.5 hours, and the mixture is held for 4 hours at 130° C.

a) 179.2 g of the phenolic resin crosslinking agent Uravar FB 209 (DSM Resins) and 17.0 g of carnauba wax (100%) are added to 3077.2 g of the epoxide-acrylate composition described above, and the mixture is held for 2 hours at 90° C. 143.6 g of triethylamine are then added in the course of 15 minutes, followed by 13,702.0 g of distilled water. This gives a 10% dispersion.

b) 179.2 g of the phenolic resin crosslinking agent Uravar FB 209 (DSM) are added to 3077.2 g of the epoxide-acrylate composition described above, and the mixture is held for 2 hours at 90° C. 143.6 g of triethylamine are then added in the course of 15 minutes, followed by 13,607.0 g of distilled water. 7.5 g of the wax emulsion Aquacer 510 made by Byk Cera (30%) are then stirred into 4500 g of the dispersion obtained.

c) 11.3 g of the carnauba wax suspension Ceracol 181 (30%) are introduced first. This quantity is predispersed with a part of the dispersion (4,500 g) prepared according to 2 b). The predispersed wax suspension is then stirred into the remainder of the dispersion prepared according to 2 b).

d) The procedure followed is as under b), with the difference that, in place of the carnauba wax emulsion, 15 g of the montanic acid ester emulsion of the trade name Luba Print KL 30 (made by L. P. Bader & Co. GmbH, 30%) is used.

An uncoated steel beverage can is connected as the anode and dipped into the dispersions of the above compositions (Examples 2a to 2 d) and into a dispersion according to 2 a) without carnauba wax (Comparison Example 2). An electrophoretic application is carried out by means of a cathodically connected electrode which is located in the can and/or by means of diverse auxiliary electrodes outside the can (U=10–400 V, t=0.1–120 sec, T=10°–40° C.). After drying of the wet film, washed with ultrafiltrate or deionized water or similar rinsing media, at 170°–240° C./0.5–5 minutes, coating films giving the following test results are obtained.

| Test | Ex. 2a | Ex. 2b | Ex. 2c | Ex. 2d | Comparison Example 2 |
| --- | --- | --- | --- | --- | --- |
| Adhesion*) | GT 0 | GT 0 | GT 0 | GT 0 | GT 0 |
| Porosity (1% NaCl solution; 6.3 V; for 4 seconds) [mA] | 0.5 | 0.3 | 0.6 | 0.3 | 5 |

*) The adhesion test is carried out after pasteurization of the cans, ie. the cans are filled with tap water and held at 100° C. for 30 minutes. The crosscut test is then carried out on the internally coated cans (rating scale GT 0 to GT 5).

EXAMPLE 3

7.5 parts of Epikote 1007 ® (Shell) and 7.5 parts of Epikote 1009 ® (Shell) are dissolved in 10.7 parts of butylglycol and 8.0 parts of hexylglycol (at 140° C.). 2.8 parts of methacrylic acid, 1.7 parts of styrene and 1.9 parts of ethyl acrylate are weighed into a monomer tank and premixed. 0.9 part of butyl-glycol and 0.15 part of t-butyl perbenzoate are weighed into the initiator tank and premixed. At 140° C., the content of the monomer tank and the content of the initiator tank are evenly added into the reactor in the course of 2 hours and 2.5 hours respectively. After the addition of the initiator has ended, the polymerization is continued for a further 4 hours at 140° C. The mixture is cooled to 90° C. and 2.4 parts of the phenolic resin crosslinking agent Uravar L9 (DSM) are then added. The mixture is then held for a further 2 hours at 90° C. 1.94 parts of triethylamine (anhydrous) are then added within 15 minutes with vigorous stirring. About 53 parts of distilled water are then added with vigorous stirring.

52.2 parts of the dispersion obtained are diluted with 47.8 parts of deionized water. This gives dispersion A.

0.4 part of the wax emulsion Aquacer (30%) is added to half of dispersion A. This gives dispersion B.

Steel beverage cans are coated on the inside with dispersions A and B. The cans coated on the inside are filled up to 1 cm below the rim with a test solution of 10% of CuSO$_4$, 10% of HCl (37%) and 80% of tap water, closed and stored for 24 hours at room temperature. After opening, the cans are rinsed, and the substrate is examined for perforation and points of incipient corrosion. By means of this test, the porosity, which may have been hidden by floating wax, is made visible.

| Evaluation: | Example with dispersion A | Example with dispersion B |
| --- | --- | --- |
| | partial perforation and corrosion in the bottom region; the trunk and neck show a little | no perforation, a few points of incipient corrosion in the bottom region; trunk and |

| underfilm corrosion | neck in order |

We claim:

1. Process for the electrophoretic internal coating of metal containers for the storage of foodstuffs and beverages, comprising the step of
connecting an uncoated metal container having an inside surface to an anode;
dipping the container into an aqueous electrophoretic coating composition, including a naturally occurring wax having a melting range of from 60° C. to 100° C., wherein the wax is present in an amount between 0.01 to 10% by weight, relative to the solids content weight of the coating composition,
connecting the container to a direct current power supply, and
applying an electric current across the metal container to cause the coating composition to be eletrodeposited on the inside surface of the metal container.

2. Process according to claim 1, wherein the wax is present in an amount between 0.5 to 3.0% by weight, relative to the solids content of the coating composition.

3. Process according to claim 1, wherein the wax used is carnauba wax or montan wax.

4. Process according to claim 1, wherein the wax is added in the form of an emulsion to the electrophoretic coating.

5. Process according to claims 1, wherein the coating composition further comprises a binder solution including
a) 30 to 70% by weight of a binder (a) having an acid number from 20 to 150 mg of KOH/g,
b) 2 to 30% by weight, of at least one resin (b) selected from the group consisting of phenoplast resins, aminoplast resins and mixtures thereof,
c) 1 to 7% by weight, of a neutralizing agent selected from the group consisting of ammonia, amines and mixtures thereof and
d) 20 to 60% by weight of organic solvents,
the total of the proportions by weight of the components (a) to (d) always being 100% by weight, wherein the binder (a) is prepared by
I. reacting
A) 20 to 80% by weight of an epoxide resin having on average more than one epoxide group per molecule and a number-average molecular weight of at least 500, with
B) 1 to 60% by weight of a polyester resin containing carboxyl groups and having a number-average molecular weight from 500 to 5,000 and an acid number from 30 to 150 mg of KOH/g,
at temperatures from 80° to 200° C., with the use of catalysts, in such a way that at least 80% of the oxirane rings initially present are opened, and
II. polymerizing in the presence of the reaction product obtained in the first process step
C) 10 to 50% by weight of ethylenically unsaturated monomers, wherein 10 to 50% by weight of the monomers contain carboxyl groups,
at temperatures of from 100° C. to 160° C., using peroxide initiators in an amount of at least 2% by weight, relative to the weight of the ethylenically unsaturated monomers C), the total of A), B) and C) being 100% by weight.

6. Process according to claim 5, wherein the wax is added in the form of an emulsion to the electrophoretic coating.

7. Process according to claim 1 or 4, wherein the coating composition further contains a binder solution including
a) 30 to 70% by weight of a binder a having an acid number from 20 to 150 mg of KOH/g,
b) 5 to 16% by weight, of at least one crosslinking agent b, selected from the group consisting of phenoplast resins, aminoplast resins and mixtures thereof,
c) 2 to 5% by weight of a neutralizing agent selected from the group consisting of ammonia and amines and mixtures thereof and
d) 20 to 60% by weight of organic solvents,
the total of the proportions by weight of the components a) to d) always being 100% by weight, wherein the binder is prepared by
I. reacting
A) 20 to 80% by weight of an epoxide resin having on average more than one epoxide group per molecule and a number-average molecular weight of at least 500 with
B) 1 to 60% by weight of a polyester resin containing carboxyl groups and having a number-average molecular weight from 500 to 5,000 and an acid number from 30 to 150 mg of KOH/g,
at temperatures from 120° to 180° C., with the use of catalysts, in such a way that at least 80% of the oxirane rings initially present are opened, and
II. polymerizing in the presence of the reaction product obtained in the first process step
C) 10 to 50% by weight of ethylenically unsaturated monomers, wherein 10 to 50% by weight of the monomers containing carboxyl groups,
at temperatures from 120° C. to 140° C., using peroxide initiators in an amount of at least 2% by weight, relative to the weight of the ethylenically unsaturated monomers C), the total of the proportions by weight of the components A) to C) always being 100% by weight.

8. Process according to claim 1 or 4, wherein the coating composition contains a binder solution including
a) 30 to 70% by weight of a binder a having an acid number from 20 to 150 mg of KOH/g,
b) 2 to 30% by weight, of at least one crosslinking agent b, selected from the group consisting of phenoplast resins, aminoplast resins, isocyanate crosslinking agents and mixtures thereof,
c) 0 to 7% by weight of a neutralizing agent selected from the group consisting of ammonia and amines and mixtures thereof and
d) 5 to 60% by weight of organic solvents,
the total of the proportions by weight of the components a) to d) always being 100% by weight, wherein the binder is prepared by
I. reacting
A) 20 to 80% by weight of an epoxide resin having on average more than one epoxide group per molecule and a number-average molecular weight of at least 850 with
B) 1 to 60% by weight of a polyester resin containing carboxyl groups and having a number-average molecular weight from 500 to 5,000 and an acid number from 2 to <30 mg of KOH/g, at temperatures from 80° to 200° C., with the use of catalysts, in such a way that at least 50% of the oxirane rings initially present are opened, and II. polymerizing in the presence of the reaction product obtained in the first process step
C) 10 to 50% by weight of ethylenically unsaturated monomers, wherein 10 to 50% by weight of the monomers containing carboxyl groups,
at temperatures from 60° C. to 200° C., using peroxide initiators in an amount of at least 2% by weight, relative to the weight of the ethylenically unsaturated monomers C), the total of the proportions by weight of the components A) to C) always being 100% by weight.

9. Process according to claim 1 or 4, wherein the coating composition contains a binder solution including
a) 30 to 70% by weight of a binder a having an acid number from 20 to 150 mg of KOH/g,
b) 5 to 16% by weight of at least one crosslinking agent b selected from the group consisting of phenoplast resins, aminoplast resins, isocyanate crosslinking agents and mixtures thereof,
c) 0 to 5% by weight of a neutralizing agent selected from the group consisting of ammonia, amines and mixtures thereof as and
d) 5 to 60% by weight of organic solvents,
the total of the proportions by weight of the components a) to d) always being 100% by weight, wherein the binder is prepared by
I. reacting
A) 20 to 80% by weight of an epoxide resin having on average more than one epoxide group per molecule and a number-average molecular weight of at least 850 with
B) 1 to 60% by weight of a polyester resin containing carboxyl groups and having a number-average molecular weight from 500 to 5,000 and an acid number from 2 to <30 mg of KOH/g,
at temperatures from 120° to 180° C., with the use of catalysts, in such a way that between 50% and <80% of the oxirane rings initially present are opened, and
II. polymerizing in the presence of the reaction product obtained in the first process step
C) 10 to 50% by weight of ethylenically unsaturated monomers, wherein 10 to 50% by weight of the monomers containing carboxyl groups,
at temperatures from 120° C. to 140° C., using peroxide initiators in an amount of at least 2% by weight, relative to the weight of the ethylenically unsaturated monomers C), the total of the proportions by weight of the components A) to C) always being 100% by weight.

10. Process according to claim 1 or 4, wherein the coating composition contains a binder solution including
a) 30 to 70% by weight of a binder a having an acid number from 45 to 150 mg of KOH/g,
b) 2 to 30% by weight, of at least one crosslinking agent b, selected from the group consisting of phenoplast resins, aminoplast resins, and mixtures thereof,
c) 1 to 7% by weight of a neutralizing agent selected from the group consisting of ammonia and amines and mixtures thereof and
d) 5 to 60% by weight of organic solvents,
the total of the proportions by weight of the components a) to d) always being 100% by weight, wherein the binder is prepared by free radical polymerization of ethylenically unsaturated monomers, a part of the monomers containing carboxyl groups, wherein the polymerization is in the presence of an epoxide resin having on average more than one epoxide group per molecule and a number-average molecular weight from about 350 to about 20,000, at temperatures from 60° C. to 200° C., using peroxide initiators in an amount of at least 2% by weight, relative to the weight of the ethylenically unsaturated monomers.

11. Process according to claim 10, wherein the epoxide resin is reacted, before the free-radical polymerization, with compounds reactive with epoxide groups.

12. Process according to claim 10, wherein the epoxide resin is reacted during the free-radical polymerization, with compounds reactive with epoxide groups.

13. Process according to claim 10, wherein the epoxide resin is reacted after the free-radical polymerization, with compounds reactive with epoxide groups.

14. Process according to claim 1 or 4, wherein the metal containers are 3-part and 2-part cans, drawn-and-ironed or otherwise deep-drawn cans.

15. Process according to claim 1 or 4, characterized in that the metal containers are in the form of can trunks and can lids.

* * * * *